(12) United States Patent
Schad et al.

(10) Patent No.: US 6,276,916 B1
(45) Date of Patent: Aug. 21, 2001

(54) FAILSAFE SHOOTING POT ACTUATOR FOR AN INJECTION MOLDING MACHINE

(75) Inventors: Robert D. Schad, Toronto; Robert Sicilia, Mississauga; Ronald Ing, Etobicoke; Bruce Catoen, Georgetown; Robert Domodossola, Brampton, all of (CA)

(73) Assignee: Husky Injection Molding Systems Ltd., Bolton (CA)

( * ) Notice: Subject to any disclaimer, the term of this patent is extended or adjusted under 35 U.S.C. 154(b) by 0 days.

(21) Appl. No.: 09/342,914

(22) Filed: Jun. 30, 1999

(51) Int. Cl.⁷ ..................................................... B29C 45/84
(52) U.S. Cl. .......................... 425/136; 425/149; 425/154; 425/171
(58) Field of Search .................................. 425/136, 149, 425/150, 151, 154, 171

(56) References Cited

U.S. PATENT DOCUMENTS

| | | |
|---|---|---|
| 3,231,656 | 1/1966 | Ninneman . |
| 3,516,123 | 6/1970 | Lang et al. . |
| 4,179,251 * | 12/1979 | Hess et al. ............................ 425/140 |
| 4,184,827 * | 1/1980 | von Hermann et al. ............ 425/135 |
| 4,460,324 | 7/1984 | Van Appledorn . |
| 4,632,653 | 12/1986 | Plocher . |
| 4,717,324 | 1/1988 | Schad et al. . |
| 4,925,161 | 5/1990 | Allan et al. . |
| 4,966,545 | 10/1990 | Brown et al. . |
| 5,098,274 | 3/1992 | Krishnakumar et al. . |
| 5,200,207 * | 4/1993 | Akselrud et al. ..................... 425/557 |
| 6,152,712 * | 11/2000 | Schad et al. .......................... 425/150 |

FOREIGN PATENT DOCUMENTS

| | | |
|---|---|---|
| 352289 | 6/1931 | (GB) . |
| 60019516 | 1/1985 | (JP) . |
| 63107522 | 5/1988 | (JP) . |
| 05245868 | 9/1993 | (JP) . |
| 08156010 | 6/1996 | (JP) . |

* cited by examiner

*Primary Examiner*—Harold Pyon
*Assistant Examiner*—Emmanuel Luk
(74) *Attorney, Agent, or Firm*—Eric C. Spencer

(57) ABSTRACT

A failsafe device, or pressure relief mechanism, for a shooting pot actuator in an injection molding machine. The shooting pot actuator has a multiple pusher rods mounted on one, or more, plates. Moving the plate holding the pusher rods depresses the shooting pot injection pistons and injects molten material into a number of mold cavities. To avoid damage to the machine from the pusher rods if an injection piston seizes, a failsafe device is used to mount the pusher rods to the plates. A shearing member is interposed, or sandwiched, between first and second apertures. Typically, the shearing member is a plate that, in normal operating conditions, blocks rearward movement of the pusher rod. However, when a predetermined shear force is applied to the shear plate, the shearing member shears and the pusher rod retracts within the channel, thereby alleviating the pressure. The failsafe device can be paired with a seizure detection system, using a laser beam, that detects piston and valve gate seizure, and provides appropriate notification or control signals.

19 Claims, 13 Drawing Sheets

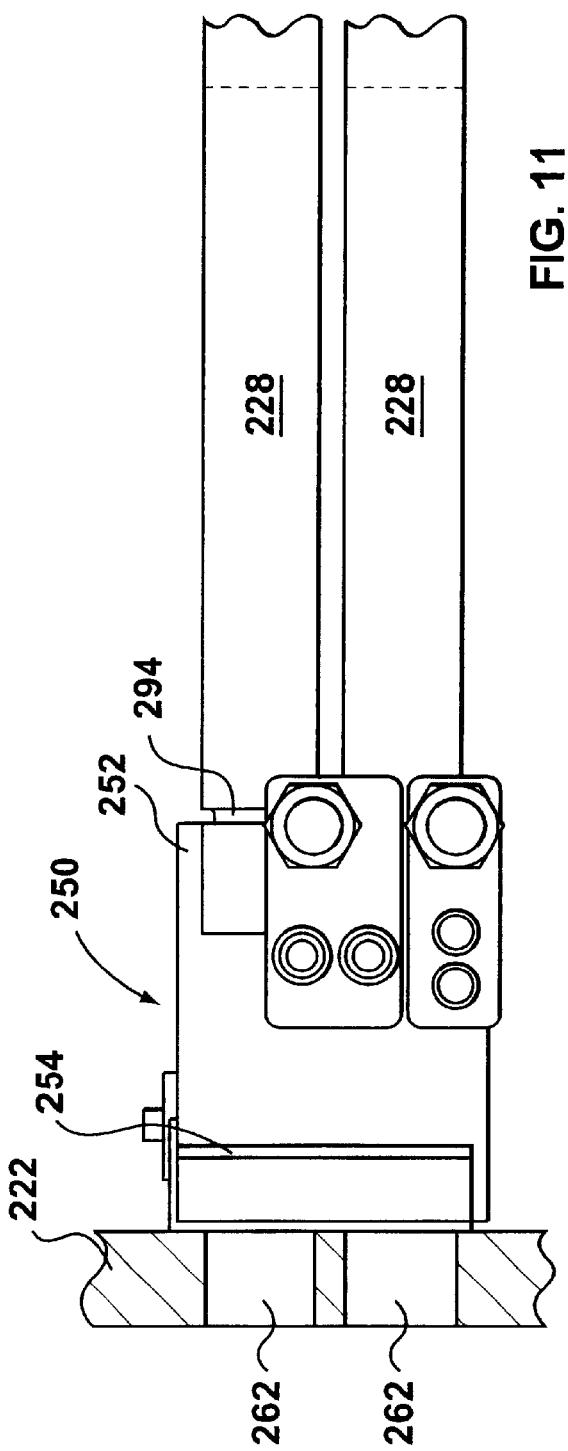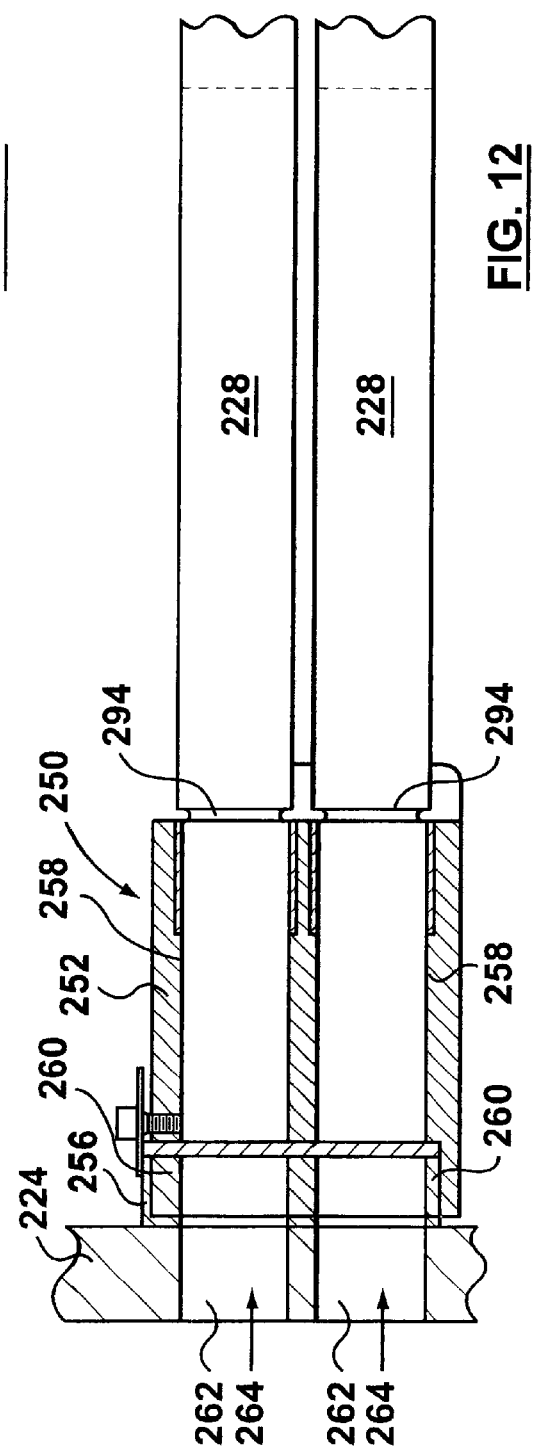

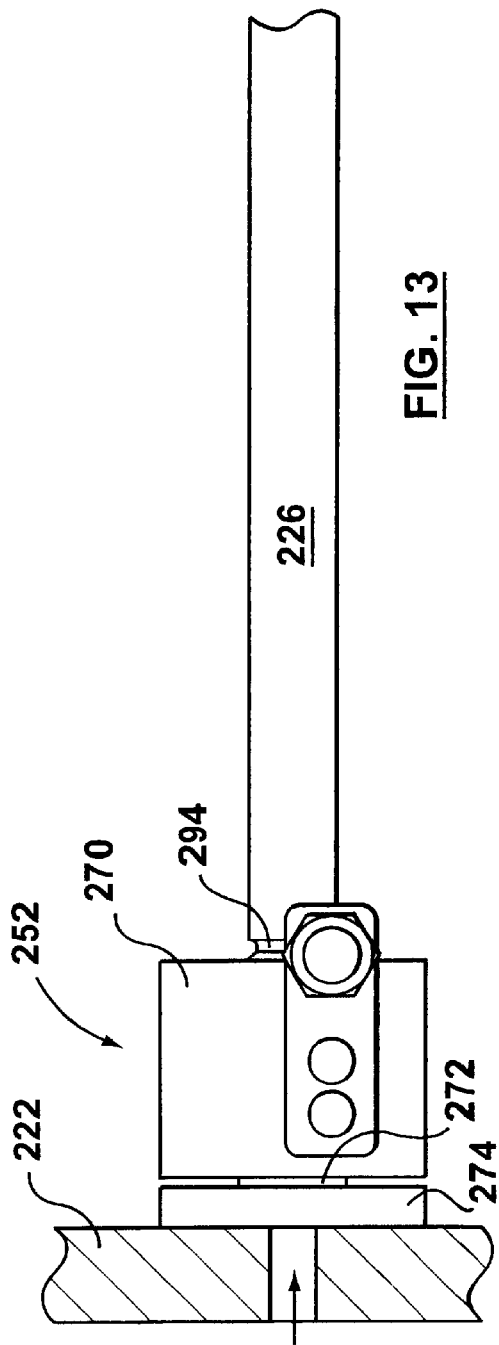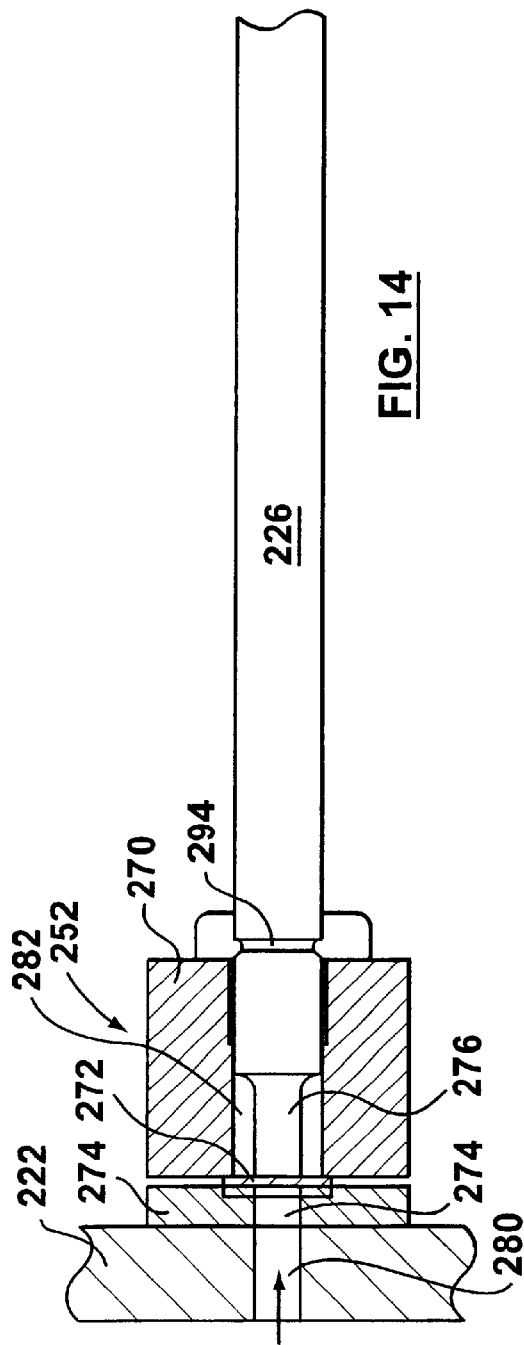

FAILSAFE SHOOTING POT ACTUATOR FOR AN INJECTION MOLDING MACHINE

FIELD OF THE INVENTION

The present invention relates to injection molding machines. More particularly, the present invention relates to the common control of multiple shooting pots in a injection molding machine, and a failsafe mechanism for preventing damage due to machine malfunction, such as injection piston or valve gate seizure.

BACKGROUND OF THE INVENTION

Employing control units, such as shooting pots, to introduce thermoplastic resins or other materials into a mold cavity in an injection molding machine is well known. Generally, a primary resin source feeds the material to a shooting pot reservoir which is, in turn, operated to feed a measured, or metered, quantity of the material into the mold cavity. U.S. Pat. No. 3,516,123, entitled "Injection Molding Machine", to Lang; and U.S. Pat. No. 3,231,656, entitled "Apparatus and Method of Plastic Molding", to Ninneman both disclose the use of shooting pots to provide accurately metered shots of resin to a mold cavity. Metering permits an accurate amount of material to be injected into a mold to ensure that a properly formed part is created and to prevent waste of material in the form of "flash", etc. due to overfilled molds. Metering is generally achieved by controlling the distance by which an injection plunger in the shooting pot is retracted and advanced for each shot.

Other metering techniques are also well known. For example, U.S. Pat. No. 4,966,545, entitled "Staged Shooting Pot for Injection Molding, to Brown, shows how a single shooting pot can be operated to cause two sequential metered injections of the same resin into the same mold cavity. U.S. Pat. No. 4,460,324, to Van Appledom, entitled "Shot Cylinder Controller for Die Casting Machines and the Like", shows how the injection speed of the piston of shooting pot can be controlled, thereby controlling the rate of injection of the resin into the mold cavity.

It is also well known to supply thermoplastic material to a multicavity mold through a hot runner system. The hot runner system can include a plurality of shooting pots, with at least one shooting pot associated with each mold cavity.

Hot runners systems can also be used for multimaterial injection, or coinjection, molding. Typically, two or more resins are injected, either simultaneously or sequentially, into each mold cavity to produce multi-layered molded structures. For example, a common application for multimaterial molding is the production of food quality containers from recycled plastic. Government standards require that any surfaces which contact the food be made of new, virgin, plastic. To take advantage of lower cost recycled plastics, manufacturers use confection techniques to encapsulate recycled material in a sheath of new plastic. U.S. Pat. No. 5,098,274 to Krishnakumar, entitled "Apparatus for Injection Molding of Multilayer Preforms", and U.S. Pat. No. 4,717,324 to Schad, entitled "Coinjection of Hollow Articles and Preforms" both disclose injection molding machines for multimaterial applications.

Generally, individual control of the shooting pot strokes is provided in these prior art injection molding machines. Separate hydraulic actuation cylinders for each shooting pot injection plunger are mounted inside the machine's stationary platen. These hydraulic cylinders must be individually set for stroke to control the individual metering of the resins into the mold cavities. The setting of the cylinders can be a hazardous operation, which is performed manually and requires personnel to reach into the machine amongst the heated injection nozzles, close to hot surfaces and heated injection materials. Furthermore, the molding process has to be interrupted for this adjustment, which can cause significant loss of production time, especially in larger machines having up to ninety six injection plungers.

U.S. Pat. No. 4,632,653 to Plocher, entitled "Press with a Plurality of Injection Plungers" describes a common actuator for the injection plungers in a transfer molding machine. The injection plungers are actuated by a hydraulic drive acting on a single crosspiece. However, the shooting pot actuator disclosed in Plocher has several limitations and disadvantages which make it inapplicable to metered injection molding machines. Firstly, the shooting pots in a compression molding machine do not provide metered shots. Instead, each shooting pot is filled with an approximate amount of resin, and the injection pistons are actuated by the crosspiece to compress the resin into the mold cavity. Plocher discloses pressure compensating pistons and overflow channels to relieve the mold cavities in the case of overfilling, which results in non-uniform product and flashing. Also, there is no mechanism provided for adjusting the stroke of the injection pistons since precise control of the amount of resin injected into the mold is not critical in such a transfer molding process. Second, the crosspiece actuator in Plocher is located within the mold, which increases the cost of designing and manufacturing the mold. Also, such a design is impractical in machines with high clamp forces as the volume occupied by the crosspiece reduces the strength of the mold component in which it is located, thus increasing the likelihood of deformation of mold components when clamped. Further, the mold must be completely disassembled to obtain access for maintenance, adjustment, or replacement.

A device capable of actuating multiple shooting pots for metered multimaterial injection is disclosed in commonly assigned U.S. patent Ser. No. 09/050,095. The shooting pot described therein has a number of pusher rods attached to plates driven externally of the mold. The pusher rods extend through apertures in the stationary platen, and each abut against a respective injection piston to inject material into the mold. One problem, with the device as originally conceived, can occur when an injection piston seizes. If a single piston seizes, the actuator will attempt to overcome the resistance of the seized piston, potentially damaging the piston, its cylinder, or buckling its associated pusher rod. This can result in costly downtime and repair. Piston seizing is relatively common, and can occur for a number of reasons. Typically, piston seizures can be easily remedied if no permanent damage is done to the injection molding machine.

It is, therefore, desirable to provide a failsafe device for a shooting pot actuator that limits damage due to injection piston seizure. It is further desirable to provide a failsafe device that alerts an operator of an injection molding machine to a seizure condition in the machine.

SUMMARY OF THE INVENTION

In a first embodiment of the present invention, there is provided a failsafe device, or pressure relief mechanism, for a shooting pot actuator in an injection molding machine. The shooting pot actuator has a multiple pusher rods mounted on one, or more, plates. Moving the plate holding the pusher rods depresses the shooting pot injection pistons and injects molten material into a number of mold cavities. To avoid damage to the machine from the pusher rods if an injection piston seizes, a failsafe device is used to mount the pusher rods to the plates. A guide block, provided with a first aperture receives an end of the pusher rod. This first aperture is aligned with a second aperture in the plate to form a channel for receiving the pusher rod. In a presently preferred embodiment, a die plate, also provided with an aligned aperture secures the guide block to the plate. A shearing member is interposed, or sandwiched, between the first and second apertures. Typically, the shearing member is a plate that, in normal operating conditions, blocks rearward movement of the pusher rod. However, when a predetermined shear force is applied to the shear plate, the shearing member shears and the pusher rod retracts within the channel, thereby alleviating the pressure. For a forty-eight cavity, multimaterial injection molding machine the appropriate shear force is equivalent to approximately 45,000 psi plastic pressure in the shooting pot cylinder.

In a further aspect of the present invention the failsafe device is paired with a seizure detection system that detects piston and valve gate seizure, and provides appropriate notification or control signals. The detection system consists of a laser transmitter and a laser receiver aligned with a row of pusher rods. Sighting means are provided on the pusher rods, such as circumferential grooves coincident with the guide block, through which a beam transmitted by the transmitter passes to the receiver under normal operating conditions, i.e. when the pressure relief mechanism has not been activated. Appropriate circuitry is attached to the receiver to detect if the beam is interrupted, and to send notification signals to the machine operator, or control signals, such as an automatic shutdown signal.

In another aspect of the present invention, there is provided a multimaterial injection molding machine incorporating the failsafe device and detection system. The machine includes a mold cavity, and at least two shooting pots that provide material to the mold cavity. Each shooting pot has an injection piston for expressing material into the mold cavity. A shooting pot actuator is attached to the machine. It has a first plate and a second plate, and each plate carries pusher rods that abut respective injection pistons. The first and second plates are sequentially driven to advance their respective pusher rods against the injection pistons. A pressure relief mechanism, or failsafe mechanism, is used to mount each each pusher rod to its respective plate. A guide block, provided with a first aperture receives an end of the pusher rod. This first aperture is aligned with a second aperture in the plate to form a channel for receiving the pusher rod. In a presently preferred embodiment, a die plate, also provided with an aligned aperture secures the guide block to the plate. A shearing member is interposed, or sandwiched, between the first and second apertures. Typically, the shearing member is a plate that, in normal operating conditions, blocks rearward movement of the pusher rod. However, when a predetermined shear force is applied to the shear plate, the shearing member shears and the pusher rod retracts within the channel, thereby alleviating the pressure. For a forty-eight cavity, multimaterial injection molding machine the appropriate shear force is equivalent to approximately 45,000 psi plastic pressure in the shooting pot cylinder.

BRIEF DESCRIPTION OF THE DRAWINGS

Preferred embodiments of the present invention will now be described, by way of example only, with reference to the attached Figures, wherein:

FIG. 11 shows a side view of a first embodiment of a failsafe mechanism for the shooting pot actuation assembly of FIG. 10;

FIG. 12 shows a cross section of the failsafe mechanism of FIG. 11;

FIG. 13 shows a side view of a second embodiment of a failsafe mechanism for the shooting pot actuation assembly of FIG. 10;

FIG. 14 shows a cross section of the failsafe mechanism of FIG. 13;

DETAILED DESCRIPTION

Figure 1:
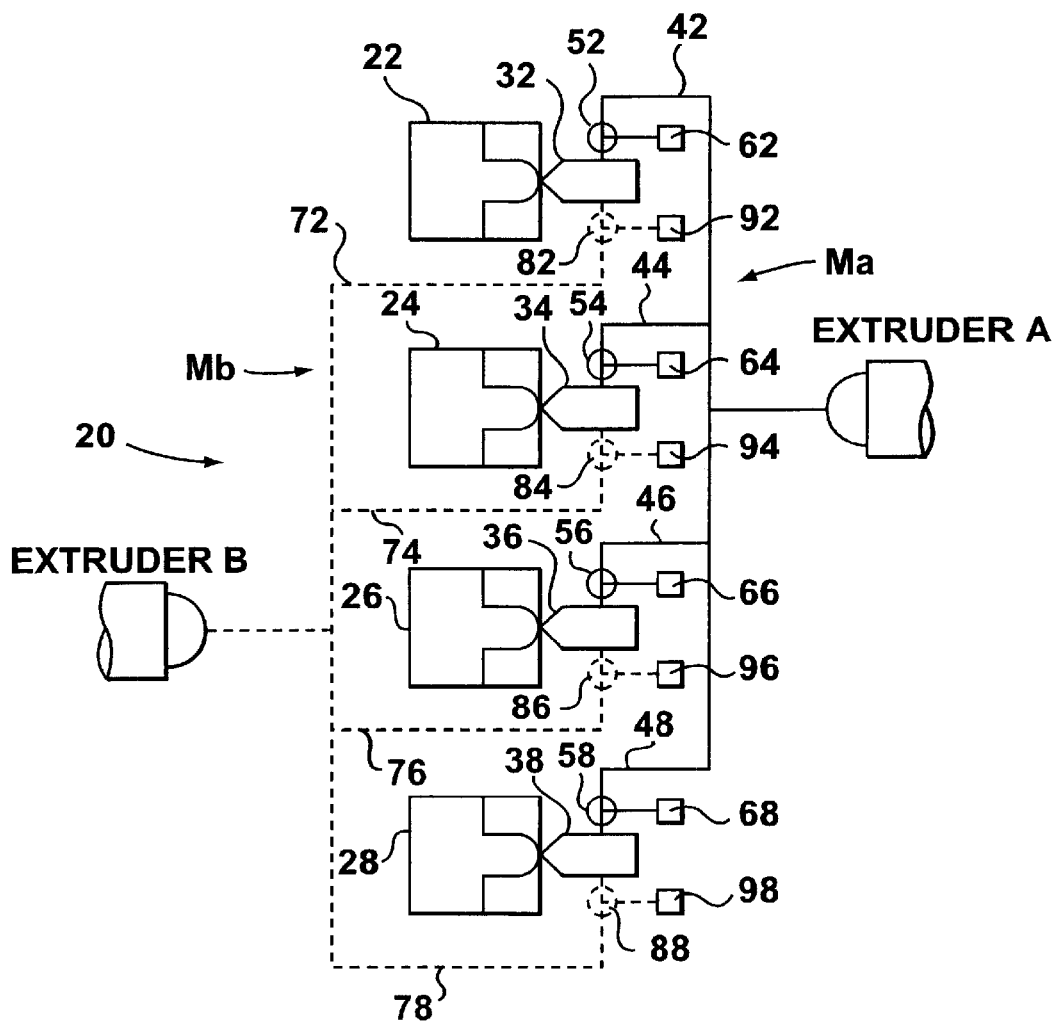
FIG. 1 is a schematic illustration of a prior art multimaterial hot runner system for a four cavity mold.

For purposes of illustration, the present invention will be described with reference to a dual hot runner injection molding machine as shown in the drawings. As will be apparent to those skilled in the art, the present invention can be generally employed in any injection molding machines having multiple shooting pots for which common control is desired.

Figure 2:
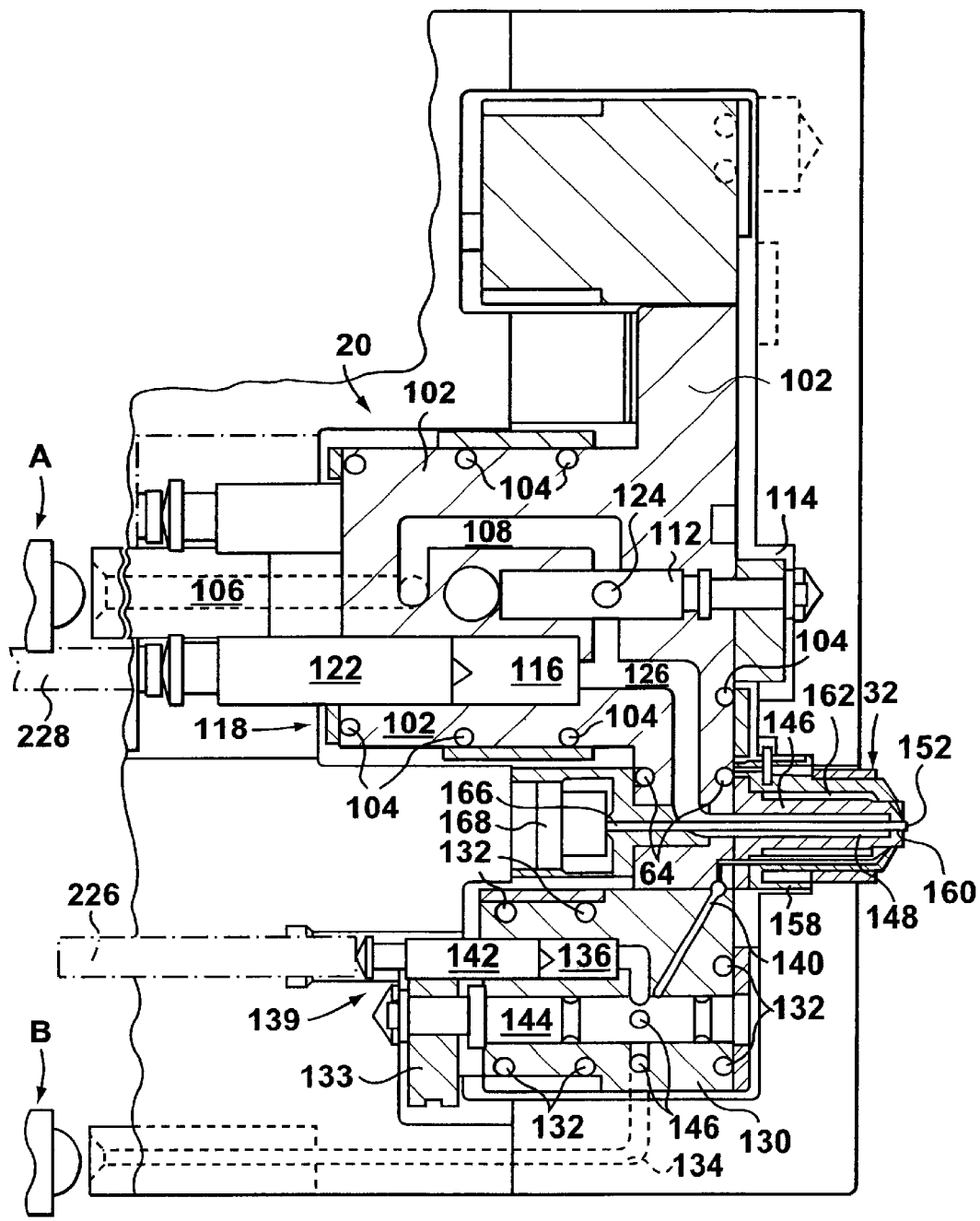
FIG. 2 shows a cross section of a prior art multimaterial hot runner system in the vicinity of one nozzle assembly.

A prior art shooting pot actuator is shown in FIGS. 1 and 2, wherein FIG. 1 shows a shows a schematic and FIG. 2 shows a cross section of a portion of a hot runner system for an injection molding machine which accommodates two thermoplastic resins, or other material to be molded, indicated generally at reference numeral 20. One resin is provided from a source identified as Extruder A, the other resin is provided from a source identified as Extruder B. While the illustrated embodiment shows two resin sources A and B, it is entirely within the scope of the invention to utilize one, two or more sources. The portion of the hot runner system 20 leading from Extruder A is shown in solid lines, and the portion of the system leading from Extruder B is shown in dashed lines.

As shown in FIG. 1, the materials supplied by Extruders A and B are fed to mold cavities 22, 24, 26 and 28 through corresponding individual confection nozzles 32, 34, 36 and 38. Extruder A supplies a heated manifold $M_a$ which, in turn, communicates with each nozzle 32, 34, 36 and 38 via hot runners or channels 42, 44, 46 and 48, respectively. Rotary valves 52, 54, 56 and 58 operate to control charging of shooting pots, or injection cylinders, 62, 64, 66 and 68.

Correspondingly, heated manifold $M_b$ leads from Extruder B to each nozzle 32, 34, 36 and 38 via hot runners 72, 74, 76 and 78. Rotary valves 82, 84, 86 and 88 control charging of shooting pots 92, 94, 96 and 98.

While the schematic of FIG. 1 shows a hot runner system 20 leading from two sources, Extruders A and B, transporting conditioned thermoplastic resins to a four cavity mold, it is entirely within the scope of the present invention to service forty-eight, or more, mold cavities originating from one, two or more sources.

As shown in FIG. 2, a central manifold block 102 is maintained at an appropriate temperature range by heating elements 104. For example, if the resin is polyethylene terephthalate (PET), the central manifold block can be maintained at a temperature ranging from approximately 500° to 550° F. Channels 106 and 108 receive plasticized resin from Extruder A. Rotary valve 112, in circuit with channel 108 and operated by link mechanism 114, controls the charging of reservoir 116 of shooting pot, or injection cylinder, 118 each of which is equipped with an injection piston, 122. Rotary valve 112 is formed with a transverse throughbore 124 and is shown in FIG. 2 in the closed position. The reservoir 116 communicates with channel 126 which, in turn, leads to the nozzle assembly 32. Nozzle assembly 32 functions to inject the resin into a mold cavity (not shown).

Similarly, for the path leading from Extruder B, a manifold block 130, which can be a separate segment from manifold 102 or a part thereof, is maintained at an appropriate temperature range by heating elements 132. For example, if the resin is ethylene vinyl alcohol copolymer (EVOH), the central manifold block can be maintained at a temperature ranging from approximately 400° to 440° F. by heaters 132. Channels 134 receives plasticized resin from Extruder B. Rotary valve 144, in circuit with channel 134 and operated by link mechanism 133, controls the charging of reservoir 136 of shooting pot, or injection cylinder, 138 each of which is equipped with an injection piston 142. Rotary valve 144 is formed with a transverse throughbore 146 and is shown in FIG. 2 in the closed position. The reservoir 136 communicates with channel 140 which, in turn, leads to the nozzle assembly 32.

Nozzle assembly 32 includes a central spigot 146 in thermal contact with manifold block 102. Spigot 146 is formed with a through channel 148 through which the resin can flow to a nozzle gate 152. As shown, a valve stem 166 moved by an a piston 168 controls the opening and closing of gate 152. Other gating systems, as are well known to those of skill in the art can be used to control the injection of resin through nozzle assembly 32.

Spigot 146 is supported in a housing 158 which is spaced from spigot 146 substantially through its length by an insulating air gap 162 to maintain the resin from Extruder B at its optimum processing temperature as it progresses to gate 152 through a channel 160.

Generally, to inject the two resins from Extruders A and B into each mold cavity, the set of injection pistons 122 for the resin supplied by Extruder A is first advanced to displace a metered amount of the first resin into the mold cavity, partially filling it. This is followed by advancing injection piston 142 to displace a metered amount of the second resin supplied by Extruder B, again only partially filling the mold cavity. Finally, a second feeding of the first resin directly through channel 126, bypassing shooting pot 116, fills the mold cavity and packs out the molded articles. As is well understood, the particular sequence chosen for producing the molded articles will depend on the desired final structure, and can include simultaneous, as well as sequential, injection into the mold cavity.

Figure 3:
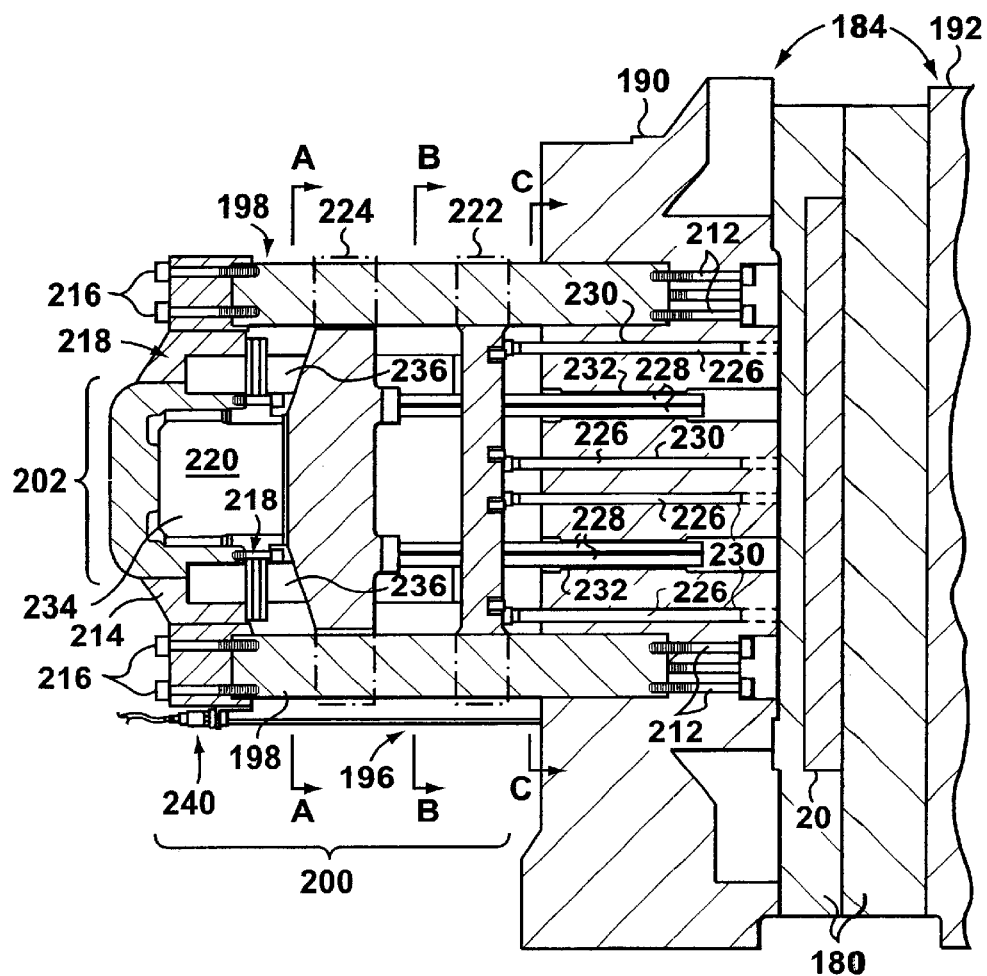
FIG. 3 shows a cross section of a portion of a prior art multimaterial injection molding machine, including a common shooting pot actuation assembly with all pushers in the retracted position.

FIGS. 3–9 show side and rear views of an injection molding machine incorporating an embodiment of the present invention. In FIG. 3, a mold 180, including hot runner system 20, is mounted between a clamp unit 184. Clamp unit 184 generally comprises a stationary platen 190 and a movable platen 192. Mounted to the exterior of the stationary platen 190 is a common shooting pot actuation assembly 196. While in the illustrated embodiment, and the following description of the present invention, the shooting pot actuation assembly 196 is mounted to the stationary platen 190, it is fully within the contemplation of the inventors that assembly 196 can be mounted to whichever platen is adjacent hot runner 20.

Figure 4:
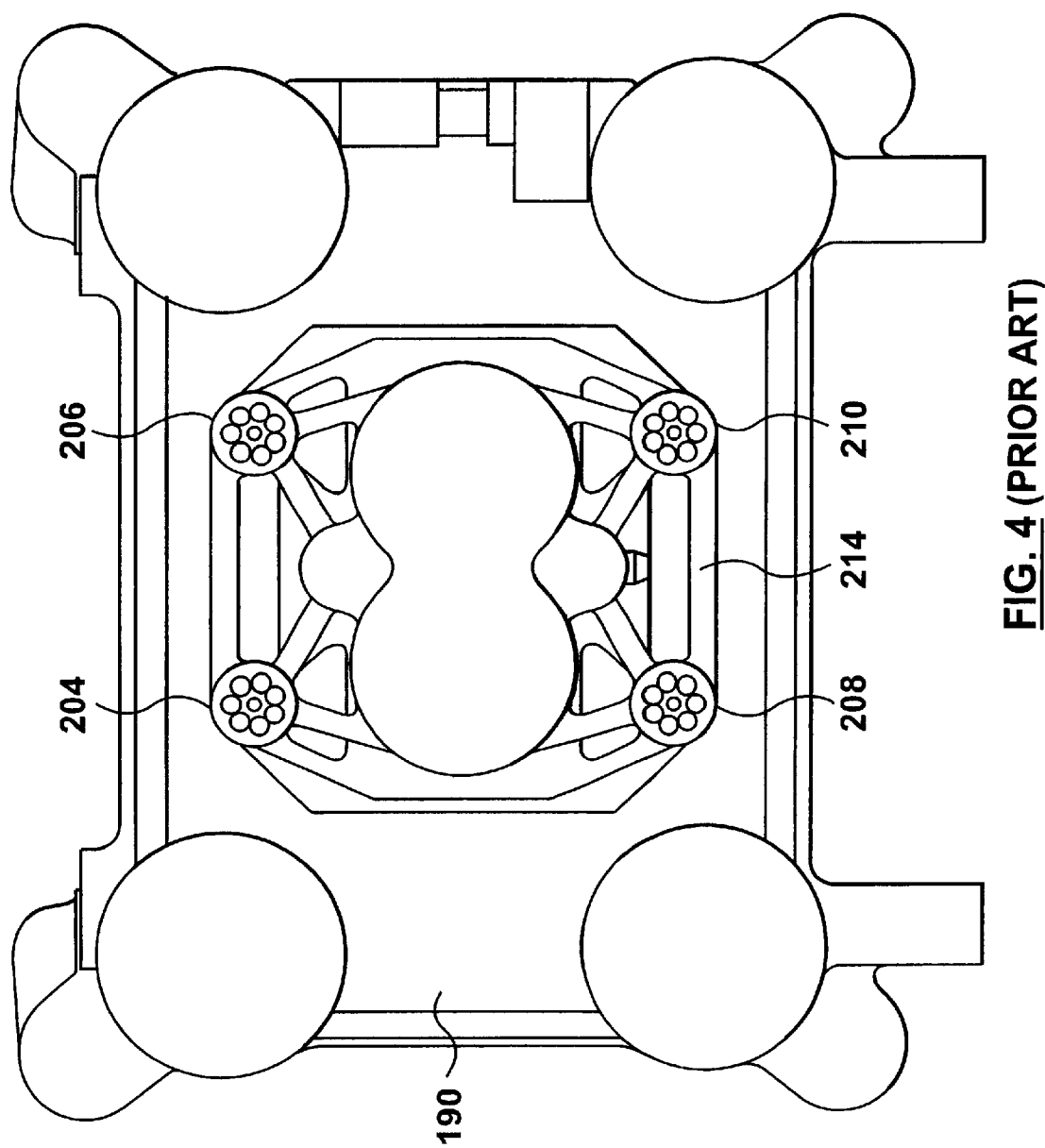
FIG. 4 shows a rear view of the machine of FIG. 3 in the direction of the line D.

Shooting pot actuation assembly 196 generally comprises a frame 198, a shooting pot actuator 200, and drive means 202. Frame 198 has four columns 204, 206, 208 and 210 secured to stationary platen 190 in a generally rectilinear pattern, as best seen in FIG. 4, by bolts 212. A drive support 214, spaced from the rear of the stationary platen 190 by the exposed length of columns 204, 206, 208 and 210 is mounted to the ends of the columns and secured by bolts 216. To drive support 214 are attached first and second drives 218 and 220, the operation of which will be further described below. Drives 218 and 220 can be hydraulic rams, linear electric motors, or any other suitable drive.

Shooting pot actuator 200 is mounted on columns 204, 206, 208 and 210 for sliding movement between drive support 214 and the rear of stationary platen 190. In the illustrated embodiment, actuator 200 has two parallel and separately movable plates 222 and 224. A first group of pushers 226 is secured to first plate 222. Pushers 226 are arranged to correspond to the position of each of the injection pistons 142 in their respective set in mold 180. Similarly, a second group of pushers 228 are secured to second plate 224, and are arranged to correspond to the position of injection pistons 122 in their respective set. Pushers 226 and 228 can be screwed into plates 222 and 224, or can be secured with "bayonet" mounts, or in any other appropriate manner. Ideally, the mounting method ensures that each mounted pusher 226, 228 extends from its respective plate 222, 224 to a substantially identical extent.

Figure 7:
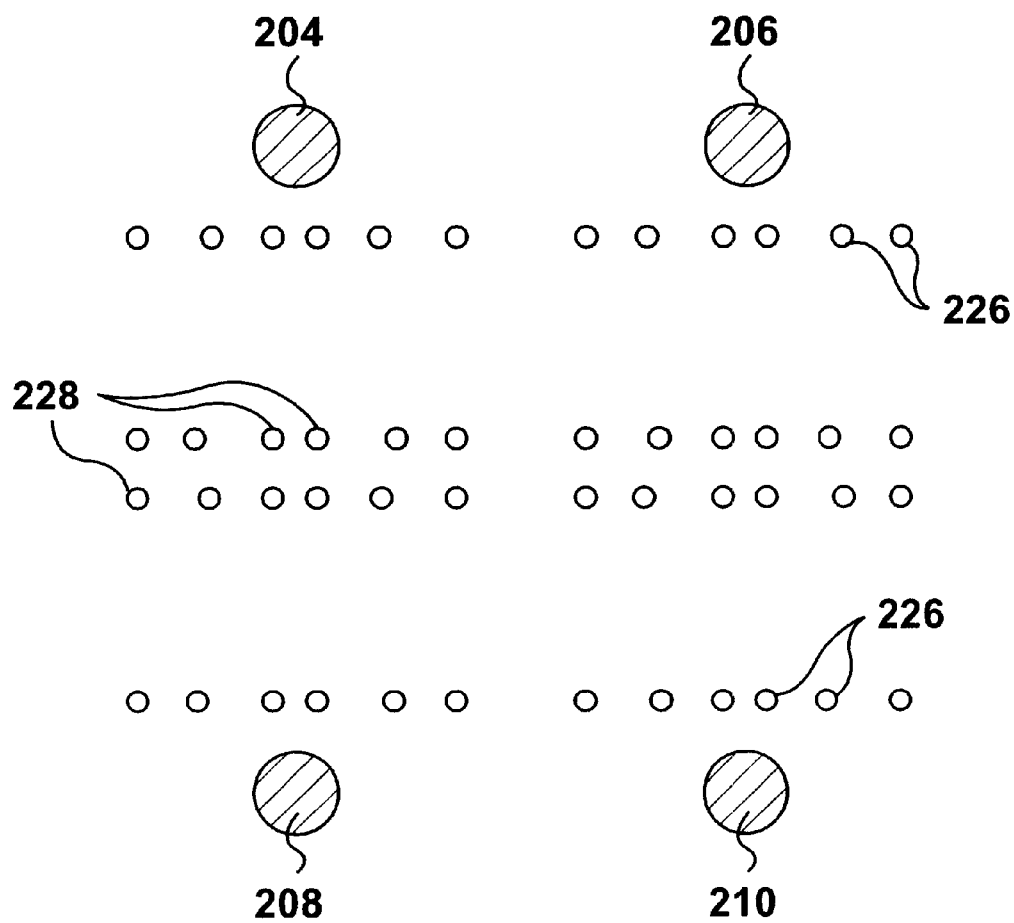
FIG. 7 shows a cross section of the machine of FIG. 3 along the line C—C.

Pushers 226 and 228 extend through bores 230 and 232, respectively, in stationary platen 190 and abut injection pistons 142 and 122. The arrangement of pushers 226 and 228 depends upon the placement of shooting pots 138 and 118, and their respective injection pistons 142 and 122, in the hot runner system 20. FIG. 7 shows an arrangement suitable for a forty-eight mold cavity confection molding machine for making preforms. To accommodate a number of different shooting pot arrangements, pushers 226 and 228 can be detached and rearranged as desired on plates 222 and 224, or, separate plate-pusher assemblies can be provided for different molds 180. It is contemplated that standardized injection piston spacings can be employed to permit molds to be interchangeable, as described below in more detail.

Figure 5:
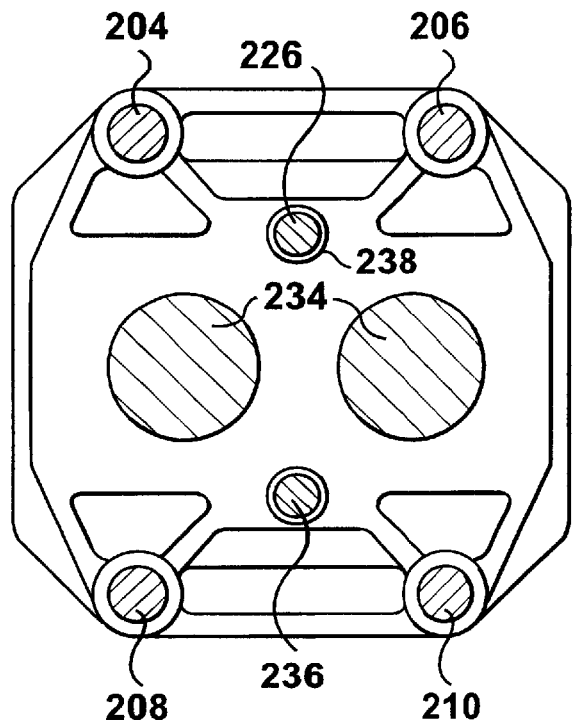
FIG. 5 shows a cross section of the machine of FIG. 3 along the line A—A.
Figure 6:
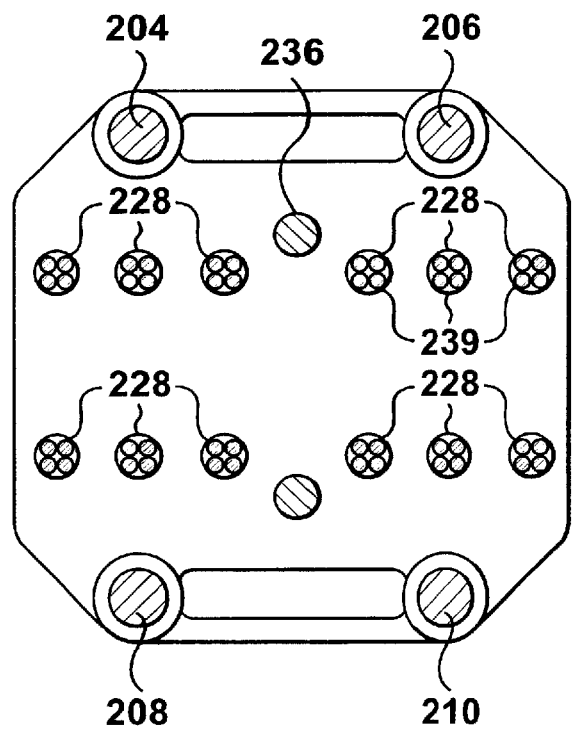
FIG. 6 shows a cross section of the machine of FIG. 3 along the line B—B.

Plate 222 can be driven reciprocally along columns 204, 206, 208 and 210 by corresponding drive 218. As best seen in FIGS. 5 and 6, drive 218 comprises two hydraulic cylinder pistons 236. Plate 224 is similarly driven by drive 220 which comprises two hydraulic cylinder pistons 234. Since plate 222 is disposed in front of plate 224, piston bores 238 are provided in plate 224 to accommodate the passage of pistons 236 and to permit free movement of plate 222 with respect to plate 224. Similarly, bores 239 are provided in plate 222 to permit the free passage of pushers 228 therethrough. Depending on the configuration of pistons 236, bores 238 and 239 can be replaced by cutouts, or omitted altogether if the pushers would not interfere.

The position and linear velocity of plates 222 and 224 can be sensed by linear position sensor means 240. Sensor 240 can be a magnetic, opto-electronic or other suitable sensor, such as those manufactured by Temposonic Inc. Sensor 240 is fixed to frame 198, or otherwise fixed relative to plates 222 and 224. The sensor 240 can be attached to a suitable control system (not shown) for conventional electronic and/or programmable control of the actuator 200, as is well known to those of skill in the art.

Figure 8:
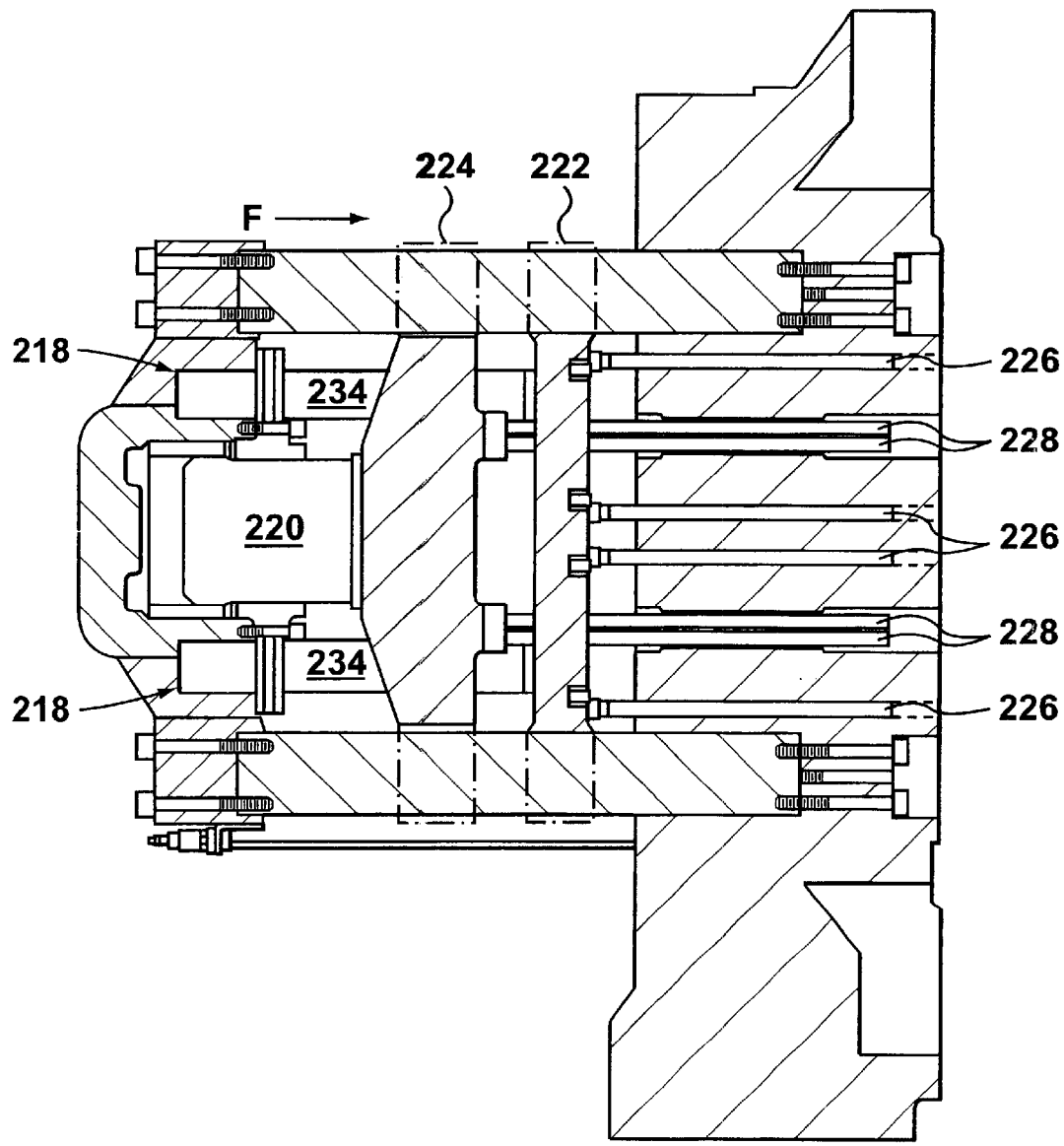
FIG. 8 shows the machine of FIG. 3 with the first set of pushers advanced.
Figure 9:
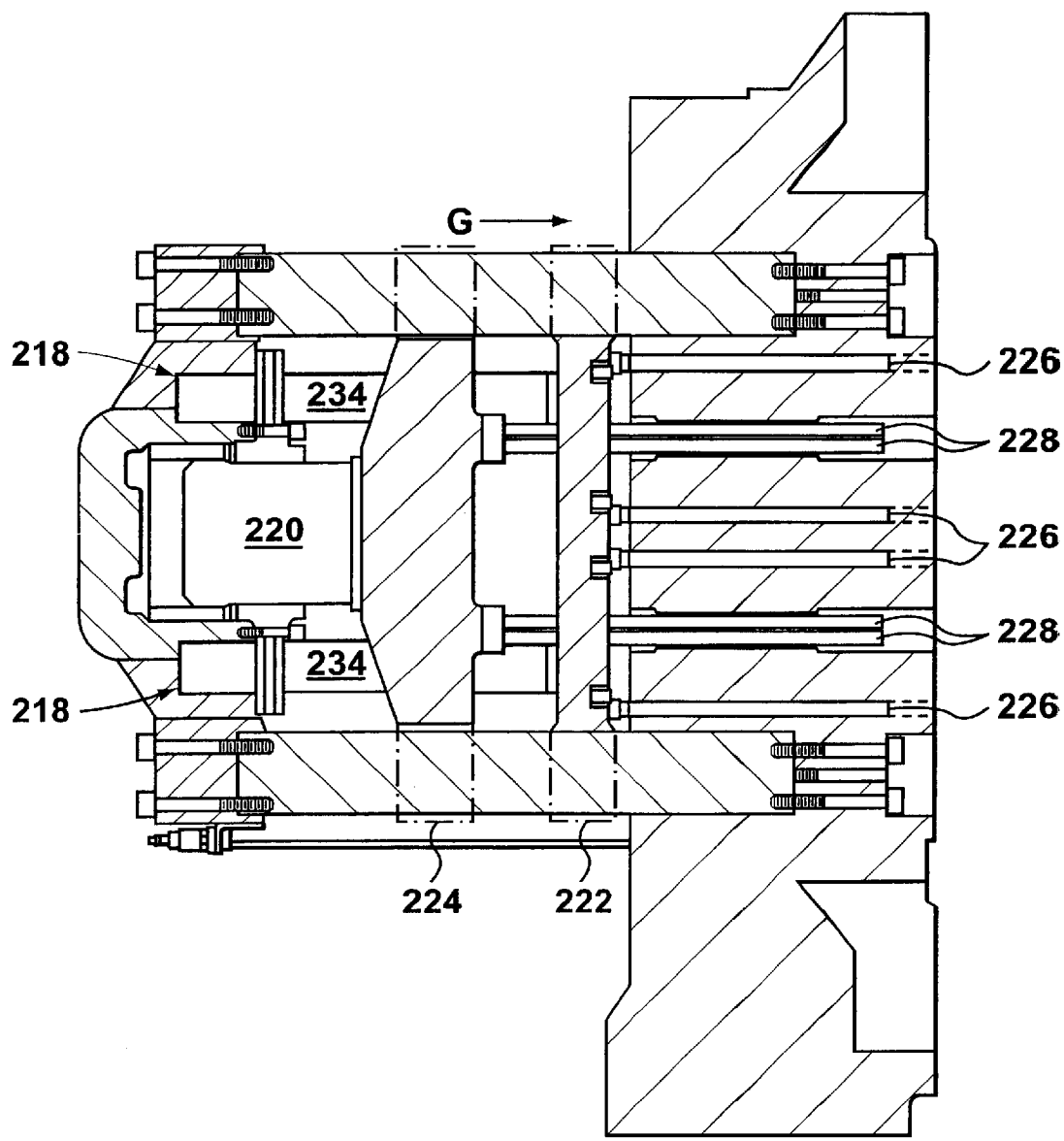
FIG. 9 shows the machine of FIG. 3 with both the first and second sets of pushers advanced.

Referring to FIGS. 3, 8 and 9, the operation of the actuator 200 will be described with respect a multimaterial injection sequence. Prior to the below described injection sequence, the clamp unit 184 is activated to clamp together the mold 180, in a manner well understood by those of skill in the art. The injection sequence begins with pushers 226 and 228, and plates 222 and 224, in a retracted position, as shown in FIG. 3. In the retracted position, the free ends of the pushers 226 and 228, which abut the injection pistons 142 and 122 in the hot runner system 20, limit the rearward movement of the injection pistons 142 and 122, and, hence the volume of material that can be received in shooting pot reservoirs 136 and 116. Adjusting the retracted positions of plates 222 and 224, by adjusting the rearward stroke of their respective cylinder pistons 234 and 236, thereby effectively meters the amount of material can be accepted by each shooting pot 136 and 116 from Extruders B and A.

Once the shooting pots 136 and 116 are filled with the desired amount of material in the manner described above, plate 224 and its pushers 228 are advanced to actuate the set of injection pistons 122, thereby injecting the metered shot of material from each reservoir 116 into its respective mold cavity. Pushers 228 are advanced by a forward stroke of cylinder pistons 236 acting upon plate 224 in the direction of the arrow F, as shown in FIG. 8. Bores 238 and 239 permit plate 222 to move forvard without affecting the position of plate 222. The position and speed of plate 224 during the forward stroke is sensed by sensor 240. Sensor 240 relays the information to the control system which, in turn, controls the speed and distance travelled by the pushers 228.

Next, as shown in FIG. 9, plate 222 and its pushers 226 are advanced to actuate injection pistons 142, thereby injecting the metered shot of material from each reservoir 136 into its respective mold cavity. Pushers 226 are advanced by a forward stroke of cylinder pistons 234 acting upon plate 222 in the direction of the arrow G. The position and speed of plate 222 are sensed by sensor 240 to control the speed and distance travelled by the pushers 226, as described above. An injection of material from Extruder A is then fed directly to the nozzle 32 to pack the mold, and the gate 152 is closed.

The coinjection molding operation then proceeds as in conventional machines. The material injected into the mold cavities is permitted to cool, the clamp unit 184 is released, and the finished product is ejected from the mold.

As will be apparent to those skilled in the art, such a shooting pot actuator is not limited to two plates, but can be extended to three or more plates-pushers and corresponding sets of shooting pots, as desired. Nor is the actuator limited to sequential injection of the multiple resins. Combinations of sequential and/or simultaneous movement of the push rods are possible to cause like injections of the respective resins.

The actuator assembly 196 can also be incorporated into a transfer molding system, as described in co-pending U.S. Provisional Application Ser. No. 60/078,587, filed Mar. 19, 1998. As described therein, the injection pistons are pulled backwards from their forward stroke position at the same rate as the shooting pots are being filled to reduce the acetaldehyde content of the finished articles. In this case, to incorporate the actuator assembly 196, the pusher rods 226, 228 are fixed to the injection pistons to permit the controlled retraction of the injection pistons, and a control system monitors and controls the rate at which the pistons are pulled backwards.

Figure 10:
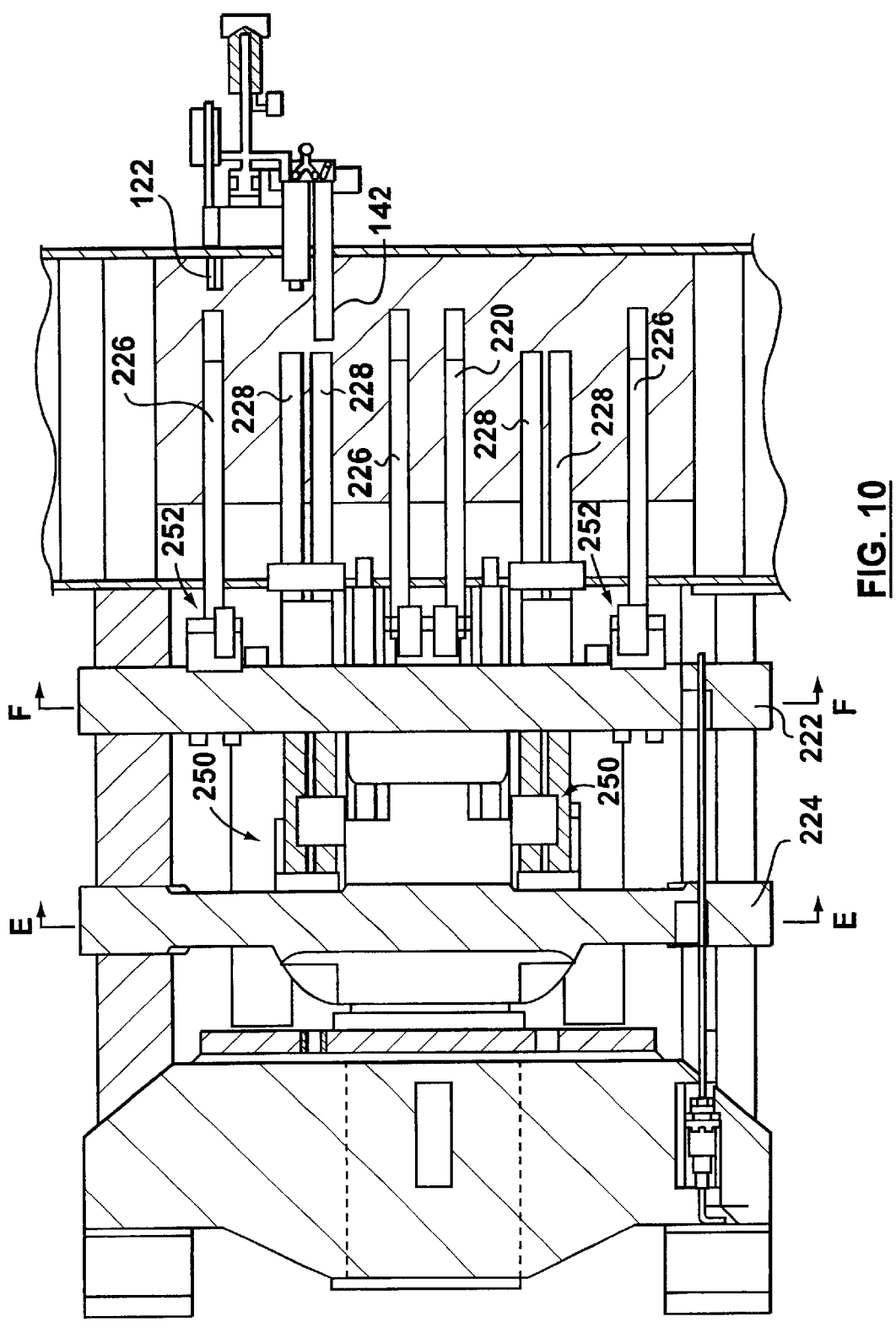
FIG. 10 shows a cross section of a portion of a multimaterial injection molding machine according to the present invention.

The present invention incorporates a failsafe mechanism into the prior art shooting pot actuator 200, as shown in FIG. 10. In certain situations, one or more injection pistons 122, 142 can seize. Since the actuator 200 operates on multiple pistons, the seizure of a single piston 122, 142 can have catastrophic effects. The actuator will attempt to overcome the resistance of the seized piston(s) and will likely cause damage, such as buckling pusher rods 226, 228, and/or damaging the piston and its associated cylinder. This is equally true of valve gate seizures. To avoid such a situation, plates 222, 224 are provided with a number of failsafe devices 250, 252, typically one per pusher rod attached to a plate.

Referring to FIGS. 11–14, failsafe devices 250, 252 are shown in greater detail. FIGS. 11 and 12 show failsafe devices 250 deployed on plate 224 for attachment to pusher rods 228. FIGS. 13 and 14 show failsafe devices 250 deployed on plate 222 for attachment to pusher rods 226.

Referring first to FIGS. 11 and 12, which show a side view and a cross section, respectively, of failsafe devices 250 attached to plate 224, each failsafe device 250 consists of a guide block 252, a shearing member, such as shear plate 254, and die plate 256. Guide block 252 and die plate 256 are provided with apertures 258, 260, respectively. Apertures 258 and 260 are aligned with each other, and with an aperture 262 formed in plate 224. The aligned apertures 258, 260 and 262 form a channel 264 that has a diameter slightly larger than the outer diameter of pusher rod 228, such that pusher rod 228 is held in a sliding fit within channel 264. Shear plate 254 is placed between guide block 252 and die plate 256 such that it blocks channel 264. Guide block 252, shear plate 254 and die plate 256 can be made of any suitable material, such as machined steel or aluminum, as will be apparent to those of skill in the art.

In operation, failsafe device 250 protects the injection molding machine from damage caused by seizure of injection pistons or valve gates. Generally, when such an overpressure situation occurs, a pusher rod can be subject to increasing longitudinal pressure as plate 224 is advanced. Shear plate 254 is designed to shear, or punch through, at a predetermined pressure to permit its associated pusher rod 228 to retract within channel 264 to relieve the excessive pressure applied thereto. For example, in a forty-eight cavity injection molding machine, it has been found that damage to the mold components and pusher rods occurs when the plastic pressure in the shooting pot exceeds approximately 60,000 psi. Therefore, incorporating a safety factor, shear plate 254 is designed to shear at approximately 45,000 psi of plastic pressure. As used herein, "plastic pressure" is defined as the pressure in the shooting pot, or a force of equivalent resistance, and "shear pressure" is defined as the plastic pressure, or a force of equivalent resistance, at which a shearing member is designed to shear. For the shear plates 254 associated with plate 224, this translates into a force of approximately 5400 lbs calculated by dividing the shear pressure by the shooting pot area, which equates to 221 psi of hydraulic pressure applied to plate 224. For the shear plates 272 associated with plate 222, this translates into a force of approximately 31500 lbs calculated by dividing the shear pressure by the shooting pot area, which equates to 224 psi of hydraulic pressure applied to plate 222. In both cases, this allows a safety factor of approximately 4 between the operating force and the shear force. The design of shear plates 254, 272 is a matter of standard engineering design, and can be modified, as desired to incorporate greater or lesser safety factors and shearing forces, depending on the desired application.

Referring to FIGS. 13 and 14, showing a side view and a cross section, respectively, of failsafe devices 252 for attaching pusher rods 226 to plate 222. Failsafe devices 252 are similar in construction to failsafe devices 250. They also consist of a guide block 270, a shearing member, such as shear plate 272, and a die plate 274. However, because the pusher rods 226 are subject to greater pressures than pusher rods 228, they must have an increased diameter to avoid buckling at the predetermined shear pressure of 45,000 psi. To maintain the same shear properties, rod 226 has its end 276 machined down to the appropriate diameter to allow shear plate 272 to shear to prevent damage to mold components. Consequently, apertures 278 and 280, formed in die plate 274 and plate 222, respectively, are of substantially the same diameter as the machined end 276, while an aperture 282, formed in guide block 270 has a diameter coinciding with the thicker portion of pusher rod 226. The aligned apertures 278, 280, and 282 form a channel 284.

In operation, failsafe device 252 operates as described above. If a pressure in excess of the calculated shear pressure is applied to any pusher rod 226, end 276 of the pusher rod 226 will shear, or punch out, the shear plate 272. Pusher rod 226 will then retract within channel 284, thereby relieving the over-pressure and preventing damage to the mold components and pusher rod.

While the failsafe devices 250, 252 have been described as having a shear plate that shears in an over-pressure situation, the shearing member can be a shear pin or other analogous component, as will occur to those of skill in the art.

Figure 15:
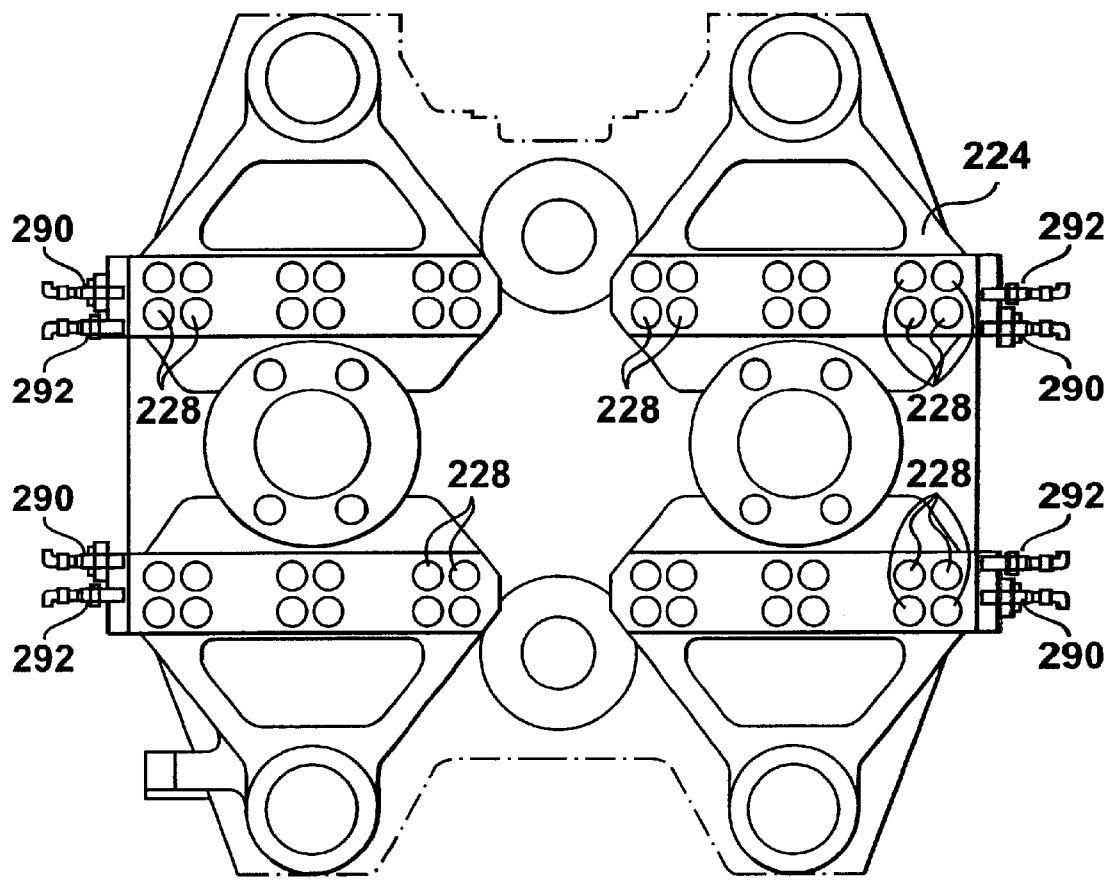
FIG. 15 shows a cross section of the machine of FIG. 10, along the line E—E.
Figure 16:
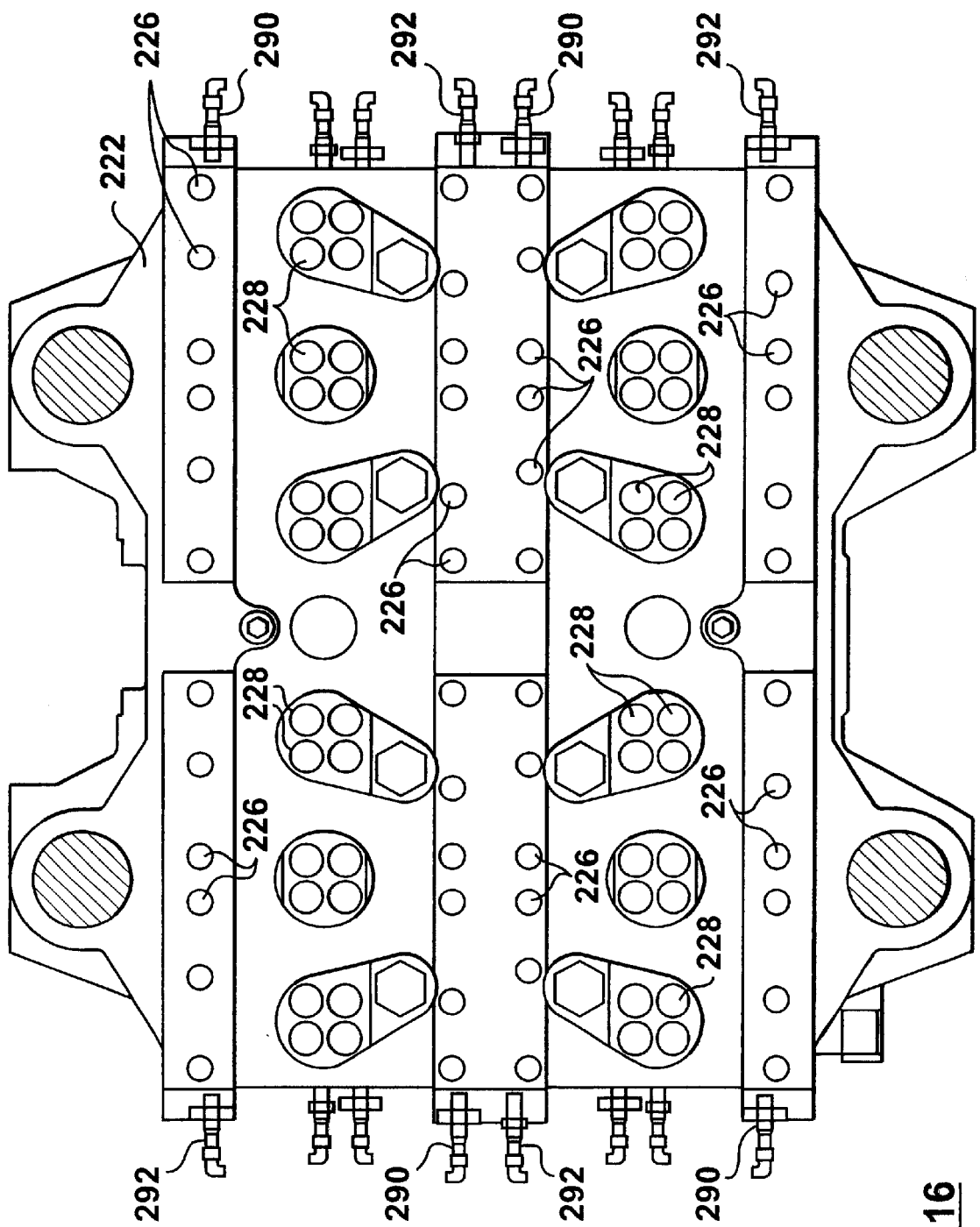
FIG. 16 shows a cross section of the machine of FIG. 10, along the line F—F.

A further feature of the present invention is a system for detecting over-pressure situations, such as piston or valve gate seizure. Referring to FIGS. 15 and 16, the detection system generally consists of a series of paired transmitters 290 and receivers 292 placed at opposite edges of plates 222, 224. Circumferential grooves 294, or other sighting means, are provided on each pusher rod 226, 228 (as shown in FIG. 11–14). Transmitters 290 and receivers 292 are paired and aligned with the upper surface of the grooves 294 which extend beyond guide blocks 252, 270 on each plate. Each transmitter/receiver 290/292 pair services a horizontal row of pusher rods. In a presently preferred embodiment, transmitters 290 and receivers 292 are laser transmitters and receivers.

In operation, when the pressure applied to a pusher rod exceeds the predetermined shear force, its associated shear plate shears and the pusher rod retracts within channel 264, 284. This causes groove 294 on that pusher rod to become misaligned with the rest of the grooves 294 in its row. This breaks the laser beam travelling between the transmitter 290 and receiver 292. Appropriate circuitry and processing hardware and software, as are well known to those of skill in the art, are attached to the transmitter/receiver pair to detect such a broken beam, and to provide appropriate automatic shutdown of the machine, or alarm and warning signals to the machine operators who can then shut the machine down, and effect appropriate repairs.

The failsafe device and seizure detection system of the present invention provide certain advantages over the prior art. Chief among these is the reduction in damage to mold components and pusher rods that can occur when an excess of force is applied by a pusher rod. This results in savings in repair costs, and reductions in machine downtime. The detection system also permits quick detection of a seized piston or valve gate such that the injection molding machine can be shut down and repaired when a problem arises.

The above-described embodiments of the invention are intended to be examples of the present invention and alterations and modifications may be effected thereto, by those of skill in the art, without departing from the scope of the invention which is defined solely by the claims appended hereto.

We claim:

1. A failsafe device for a shooting pot actuator in an injection molding machine, the shooting pot actuator having a plurality of pusher rods mounted on a plate, the pusher rods abutting a respective plurality of injection pistons for injecting a molten material into a mold, the plate being driven to advance the pusher rods simultaneously against the injection pistons, comprising:

means for mounting each pusher rod to the plate, the mounting means including a first aperture for receiving an end of the pusher rod, the aperture being aligned with a second aperture in the plate to form a channel for receiving the pusher rod;

a shearing member interposed between the first and second apertures, the shearing member having a predetermined shear force which, if exceeded, causes the shearing member to shear to permit the pusher rod to retract within the channel.

2. A failsafe device according to claim 1, wherein the shearing member is a shear plate.

3. A failsafe device according to claim 1, wherein the shearing member is a shear pin.

4. A failsafe device according to claim 2, wherein the mounting means includes a guide block and die plate secured to the plate.

5. A failsafe device according to claim 1, wherein the predetermined shear force is equivalent to approximately 45,000 psi of plastic pressure.

6. A failsafe device according to claim 1, further including a seizure detection system.

7. A failsafe device according to claim 6, wherein the seizure detection system includes:

sighting means provided on each of a row of the pusher rods;

a laser transmitter and a laser receiver aligned with the sighting means such that a laser beam can pass from the transmitter to the receiver; and means for determining if the beam has been broken for indicating actuation of the failsafe device.

8. A failsafe device according to claim 7, wherein the sighting means are circumferential grooves provided on the pusher rods.

9. A seizure detection system, for detecting piston and valve gate seizure in an injection molding machine having a shooting pot actuator, the shooting pot actuator having a plurality of pusher rods mounted on plate, the pusher rods abutting a respective plurality of injection pistons for injecting a molten material into a mold, the plate being driven to advance the pusher rods simultaneously against the injection pistons, the shooting pot actuator further having a pressure relief mechanism activated when a piston or valve gate seizure occurs, comprising:

a laser transmitter and a laser receiver aligned with a row of the pusher rods;

sighting means comprising of circumferential grooves provided on the pusher rods through which a beam transmitted by the transmitter passes to the receiver when the pressure relief mechanism has not been activated; and means for detecting if the beam is interrupted.

10. A seizure detection system according to claim 9, further including means to control the injection molding machine in response to the detection means.

11. A seizure detection system according to claim 10, wherein the control means includes a shutdown signal.

12. An multimaterial injection molding machine, comprising:

a mold cavity;

at least two shooting pots for providing material to the mold cavity, each shooting pot having an injection piston for expressing material into the mold cavity;

a shooting pot actuator having a first plate and a second plate, each plate carrying pusher rods for abutting a respective injection piston, the first and second plates being sequentially driven to advance their respective pusher rods against the injection pistons;

a pressure relief mechanism for mounting each pusher rod to its respective plate, the mounting means including a first aperture for receiving an end of the pusher rod, the aperture being aligned with a second aperture in the plate to form a channel for receiving the pusher rod, a shearing member interposed between the first and second apertures, the shearing member having a predetermined shear force which, if exceeded, causes the shearing member to shear to permit the pusher rod to retract within the channel.

13. A multimaterial injection molding machine according to claim 12, wherein the shearing member is a shear plate.

14. A multimaterial injection molding machine according to claim 12, wherein the shearing member is a shear pin.

15. A multimaterial injection molding machine according to claim 13, wherein the mounting means includes a guide block and die plate secured to the plate.

16. A multimaterial injection molding machine according to claim 12, wherein the predetermined shear force is equivalent to approximately 45,000 psi of plastic pressure.

17. A multimaterial injection molding machine according to claim 12, further including a seizure detection system.

18. A multimaterial injection molding machine according to claim 17, wherein the seizure detection system includes:

sighting means provided on each of a row of pusher the rods;

a laser transmitter and a laser receiver aligned with the sighting means such that a laser beam can pass from the transmitter to the receiver; and means for determining if the beam has been broken for indicating actuation of the failsafe device.

19. A multimaterial injection molding machine according to claim 18, wherein the sighting means are circumferential grooves provided on the pusher rods.

* * * * *